United States Patent [19]
Yang

[11] Patent Number: 5,118,993
[45] Date of Patent: Jun. 2, 1992

[54] VARIABLE VOLTAGE REGULATOR

[76] Inventor: Tai-Her Yang, 5-1 Taipin Street, Si-Hu Town, Dzan-Hwa, Taiwan

[21] Appl. No.: 617,155

[22] Filed: Nov. 23, 1990

[51] Int. Cl.⁵ .................. H05B 37/02; G05F 1/00
[52] U.S. Cl. ...................... 315/200 R; 315/205; 315/291; 338/219
[58] Field of Search .............. 315/200 R, 205, 208, 315/291, DIG. 4, 307, 293, 294, 315, 283; 338/219, 215, 283, 308; 363/126

[56] References Cited

U.S. PATENT DOCUMENTS

| | | | |
|---|---|---|---|
| 3,215,891 | 11/1965 | Fritz et al. | 315/200 R |
| 3,935,505 | 1/1976 | Spiteri | 315/291 X |
| 4,450,385 | 5/1984 | Buhrer | 315/205 |
| 4,580,206 | 4/1986 | Lawson, Jr. | 323/231 X |
| 4,672,269 | 6/1987 | Kamohara | 338/219 X |

FOREIGN PATENT DOCUMENTS 1934223  1/1971  Fed. Rep. of Germany .

Primary Examiner—Eugene R. Laroche
Assistant Examiner—Ali Neyzari
Attorney, Agent, or Firm—Leonard Bloom

[57] ABSTRACT

A variable voltage regulator for incrementally regulating an input signal. The regulator includes a diode configuration which allows incremental reduction or clamping of an AC or DC input signal. Such a universal diode configuration has widespread use in many different voltage regulating applications, either as an integrated circuit or in discrete component form.

15 Claims, 3 Drawing Sheets

VARIABLE VOLTAGE REGULATOR

BACKGROUND OF THE INVENTION

1. Field of the Invention

The present invention relates to a variable voltage regulator capable of incrementally regulating an input signal, and more particularly to a universal diode configuration which allows incremental reduction or clamping of an input signal.

2. Description of the Background

Conventionally, single diodes are used in DC-to-DC, AC-to-DC and AC-to-AC regulators to provide a fixed voltage reduction. Additionally, zener diodes may be used to clamp an AC output at a fixed level. However, such diodes typically have a fixed rating and are only usable in a narrow range of circuit applications.

SUMMARY OF THE INVENTION

It is, therefore, an object of the present invention to provide a voltage regulator having a universal diode arrangement which allows for incremental adjustment of the regulation provided thereby.

It is another object of the invention to provide a voltage regulator as described above which has an application in many well-known circuits and which can be efficiently mass-produced.

It is still another object of the present invention to provide the above-described voltage regulator in integrated circuit or in discrete component form.

According to the present invention, the above-described and other objects are accomplished by providing an improved variable voltage regulator. The regulator comprises a plurality of diodes connected in series with a first input terminal, a second input terminal, a plurality of tap leads, each tap lead being connected between a corresponding cathode of said series-connected diodes, a single-pole multi-throw switch for connecting the tap leads to the second input terminal in order to select a combination of the diodes for series-connection with the load, thereby incrementally regulating a voltage across the load when an input signal is applied to the first and second input terminals.

BRIEF DESCRIPTION OF THE DRAWINGS

Other objects, features and advantages of the present invention will become more apparent from the following detailed description of preferred embodiments and certain modifications thereof when taken together with the accompanying drawings, in which.

DETAILED DESCRIPTION OF THE PREFERRED EMBODIMENTS

Figure 1:
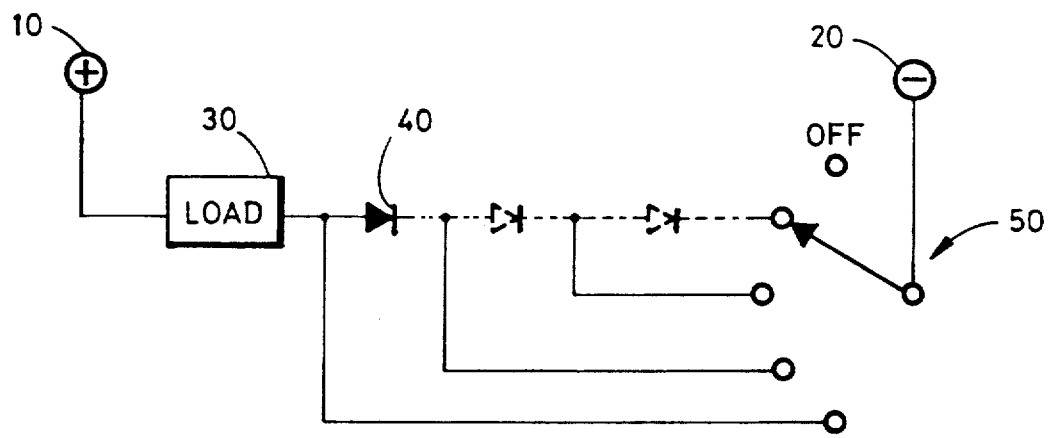
FIG. 1 is a schematic diagram of a DC-to-DC voltage regulator according to one embodiment of the present invention.

FIG. 1 illustrates a DC-to-DC voltage regulator having a positive input terminal 10 and a negative input terminal 20. A number of series-connected diodes 40 are connected with a load 30 to positive input terminal 10. Tap leads run from the anode of each of the series-connected diodes 40 to a corresponding throw terminal of a single pull multi-throw switch 50. The pole terminal of switch 50 is connected to negative input terminal 20.

In operation, a DC input signal is applied across terminals 10 and 20. The voltage across load 30 can be adjusted by the position of switch 50. If switch 50 is connected to the anode of diode 40 nearest load 30, then no voltage drop will occur across the series-connected diodes 40 and the voltage appearing across load 30 will be equal to the DC input voltage. Switch 50 can be switched to another throw terminal thereby causing one or more of diodes 40 to be connected in series with load 30 and input terminals 10 and 20. As more diodes 40 are connected in series, the voltage drop appearing across diodes 40 will increase and the voltage appearing across load 30 will incrementally decrease. Thus, the voltage appearing across load 30 can be selectively reduced by operation of switch 50.

Figure 2:
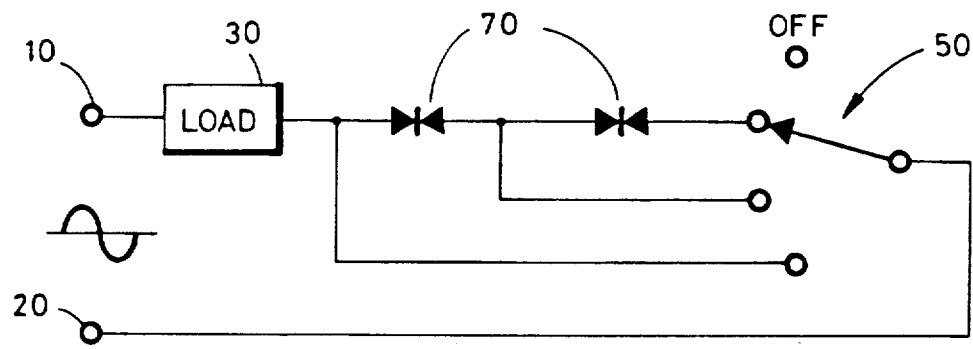
FIG. 2 is a schematic diagram of an AC-to-AC voltage regulator using zener diodes to clamp an output voltage according to a second embodiment of the present invention.

FIG. 2 illustrates an AC-to-AC voltage regulator in which a number of diode pairs 70 are formed by connecting the cathodes of individual diodes. The diode pairs 70 are connected in series to an AC input terminal 10 through load 30. A tap lead is connected between each anode of diodes 70 and a corresponding throw terminal of a single pull multi-throw switch 50. The pole terminal of switch 50 is connected to input terminal 20. Diodes 70 have a fixed zener breakdown voltage.

In operation an AC input signal is applied across terminals 10 and 20. Switch 50 may then be positioned to connect the anode of a diode pair 70 to load 30. If the anode of the diode pair 70 nearest the load 30 is connected, then the entire AC input signal will be applied across load 30. However, switch 50 may be positioned to connect any number of diode pairs 70 in series with load 30. This allows incremental adjustment of the zener breakdown voltage by operation of switch 50, which in turn clamps the AC signal applied across load 30 to a preselected peak voltage level.

Figure 3:
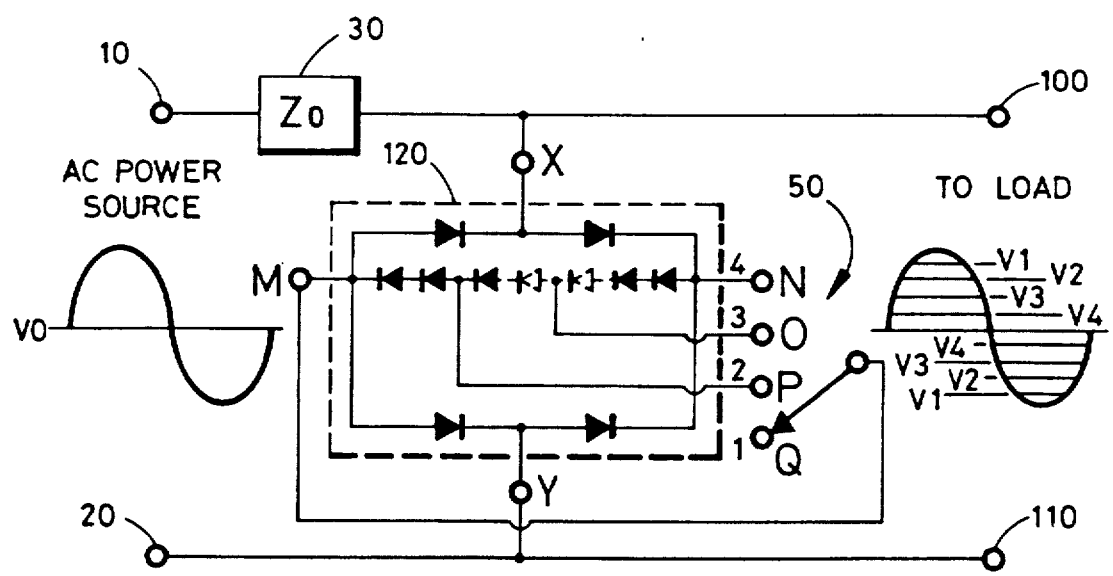
FIG. 3 is a schematic diagram of an AC-to-AC voltage regulator using zener diodes to clamp an output voltage according to a third embodiment of the present invention.

FIG. 3 illustrates an AC-to-AC voltage regulator having a pair of AC input terminals 10 and 20, and a pair of AC output terminals 100 and 110. Input terminal 10 is connected to output terminal 100 through an impedance 30, and input terminal 20 is connected directly to output terminal 110. In addition, a regulating circuit 120 having seven connecting terminals X, Y, M and N-Q is provided. Connecting terminals X and Y of regulating circuit 120 are connected between output terminals 100 and 110 respectively. Regulating circuit 120 includes a diode bridge connected between terminals X, Y, M and N. In addition to the diode bridge a number of diodes are connected in series between terminals M and N. Tap leads N-Q extend from between the series-connected diodes. The throw terminals of a single pole multi-throw switch 50 are each connected to a corresponding one of the tap leads. The pole terminal of switch 50 is connected to terminal M. The series connected diodes may be conventional diodes or zener diodes.

In operation, an AC signal is applied at terminals 10 and 20. Switch 50 may be positioned to connect any one of the tap leads to terminal M. In this manner, regulating circuit 120 can be adjusted to act as a voltage clamp, and the peak output voltage can be clamped at a preselected level depending on the number of series connected diodes which are short-circuited. Thus, the output voltage can be incrementally clamped at any level ranging from the peak level of the AC input signal to zero. The clamped voltage is output to terminals 100 and 110.

Figure 4:
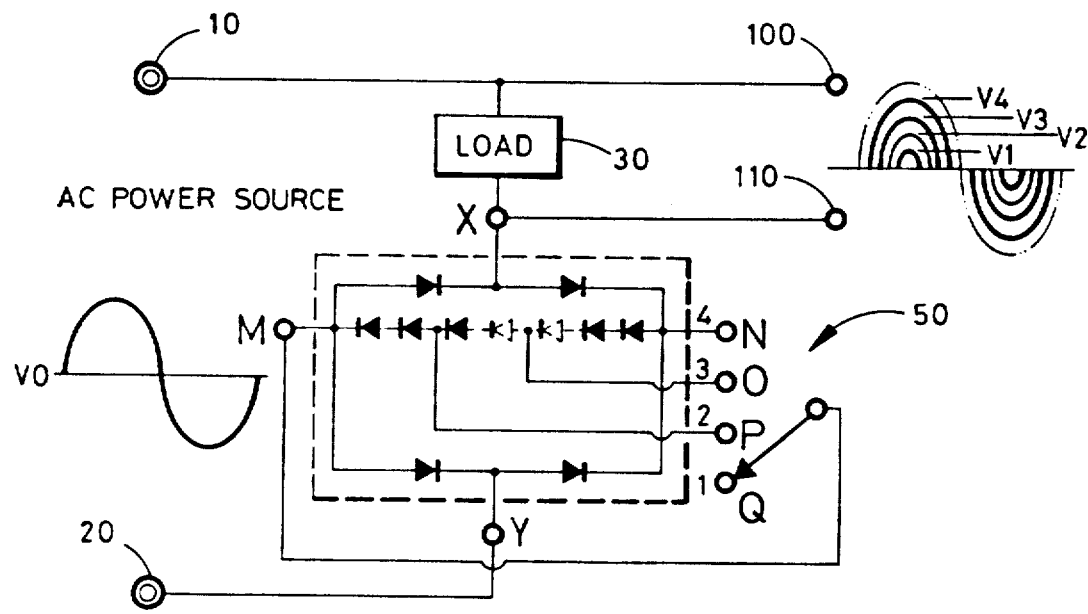
FIG. 4 is a schematic diagram of an AC-to-AC voltage regulator using zener diodes to amplify an output voltage according to a fourth embodiment of the present invention.

FIG. 4 illustrates another embodiment of the invention wherein load 30 is connected between terminal X and the connection of terminals 10 and 100. Output terminal 110 is connected to terminal X. In operation, the device shown in FIG. 4 acts as a voltage amplifier by which the voltage appearing across output terminals 100 and 110 can be incrementally reduced from the voltage applied to input terminals 10 and 20. The incremental reduction in output voltage is determined by the position of switch 50.

Figure 5:
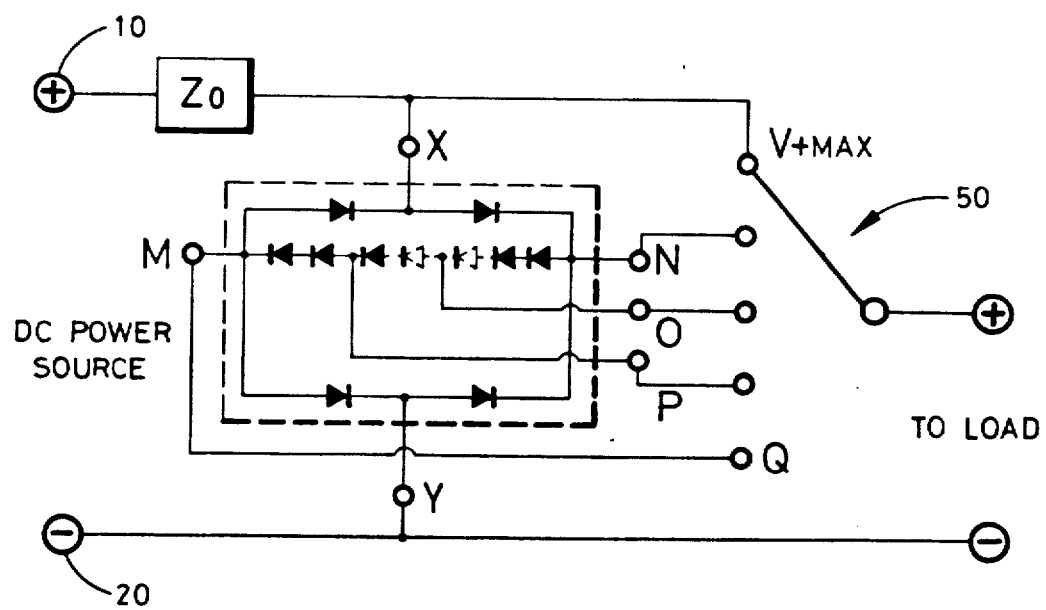
FIG. 5 is a schematic diagram of a DC-to-DC voltage regulator using diodes to provide a selectable output voltage according to a fifth embodiment of the present invention.

FIG. 5 illustrates a DC-to-DC voltage regulator using a diode arrangement similar to the devices shown in FIGS. 3 and 4. In operation, a DC input signal is applied to input terminals 10 and 20. A voltage drop appears across the series connected diodes, but the voltage drop can be incrementally reduced by by-passing selected diodes via positioning of switch 50.

Figure 6:
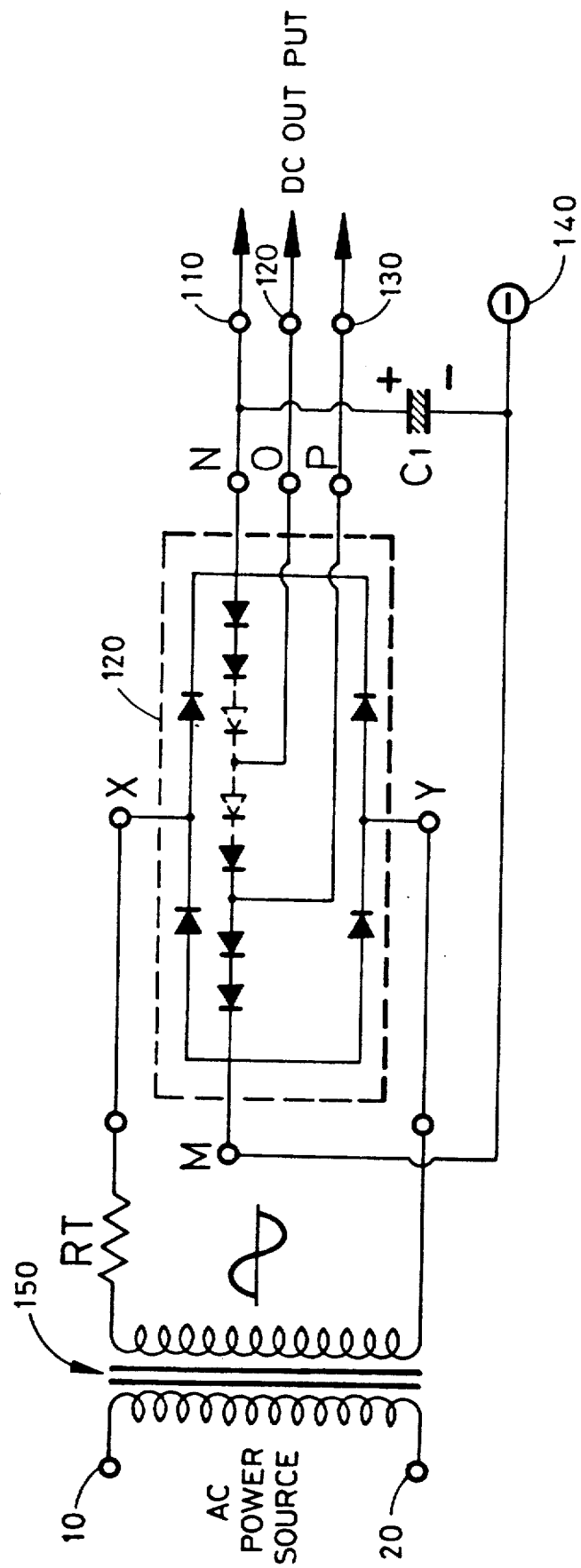
FIG. 6 is a schematic diagram of a power supply having an AC-to-DC voltage regulator using diodes to provide a selectable output voltage according to a sixth embodiment of the present invention.

FIG. 6 depicts a power supply having a diode configuration substantially as shown in FIG. 5. Tap leads N-P are drawn directly from between the series-connected diodes and are run to a number of output terminals 110 through 140 for supplying an equal number of different voltage outputs. A capacitor C1 is connected between output terminals 110 and 140. In operation, an AC signal is applied to input terminals 10 and 20. Transformer 150 amplifies the AC input signal and supplies the amplified signal to terminals X and Y of regulator circuit 120. The diode bridge of regulator circuit 120 rectifies the AC signal. Capacitor C1 smoothes the rectified signal to provide a constant DC output. Voltage drops occur across the series-connected diodes between terminals M and N. The tap leads N-P which are connected between the series-connected diodes output the incremental voltage levels. This embodiment is especially useful because various regulated DC inputs are typically required by the external circuits which are attached to power supplies.

Having now fully set forth the preferred embodiments and certain modification of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

I claim:

1. A variable voltage regulator, comprising:
   a first terminal and a second terminal for receiving an AC input signal;
   a third terminal and a fourth terminal for outputting a regulated AC signal;
   a regulating circuit having a fifth terminal coupled to said first terminal and said third terminal, a sixth terminal connected to said second terminal and said fourth terminal, a seventh terminal and an eighth terminal, said regulating circuit further comprising,
   a diode bridge including a first diode connected between said fifth terminal and said seventh terminal, a second diode connected between said fifth terminal and said eighth terminal, a third diode connected between said seventh terminal and said sixth terminal, a fourth diode connected between said eighth terminal and said sixth terminal, and
   a diode chain including a plurality of diodes connected in series between said seventh terminal and said eighth terminal;
   a plurality of tap leads, each tap lead being connected to an anode of a corresponding diode in said series-connected diode chain;
   whereby said seventh terminal can be selectively connected to said tap leads and said eighth terminal, thereby short circuiting a selected number of said plurality of diodes in said diode chain so that an AC input signal applied to said first and second terminals can be incrementally regulated and output on said third and fourth terminals.

2. A variable voltage regulator according to claim 1, wherein said plurality of diodes in said diode chain are zener diodes and said seventh terminal can be selectively connected to said tap leads and said eighth terminal, thereby short circuiting a selected number of said plurality of zener diodes in said diode chain to provide an incrementally adjustable voltage clamp when an AC input signal is applied to said first and second terminals.

3. A variable voltage regulator according to claim 1, wherein an impedance is connected between said first terminal and a junction of said third terminal and fifth terminal.

4. A variable voltage regulator according to claim 3, wherein said plurality of diodes in said diode chain are zener diodes and said seventh terminal can be selectively connected to said tap leads and said eighth terminal, thereby short circuiting a selected number of said plurality of zener diodes in said diode chain to provide an incrementally adjustable voltage clamp when an AC input signal is applied to said first and second terminals.

5. A variable voltage regulator according to claim 1, wherein an impedance is connected between said fifth terminal and a junction of said first terminal and third terminal.

6. A variable voltage regulator according to claim 5, wherein said plurality of diodes in said diode chain are zener diodes and said seventh terminal can be selectively connected to said tap leads and said eighth terminal, thereby short circuiting a selected number of said plurality of zener diodes in said diode chain to provide an incrementally adjustable voltage regulator when an AC input signal is applied to said first and second terminals.

7. A variable voltage regulator, comprising:
   a first terminal and a second terminal for receiving a DC input signal;
   a third terminal and a fourth terminal for outputting a regulated DC signal;
   a regulating circuit having a fifth terminal coupled to said first terminal and said third terminal, a sixth terminal connected to said second terminal and said fourth terminal, a seventh terminal and an eighth terminal, said regulating circuit further comprising,

- a diode bridge including a first diode connected between said fifth terminal and said seventh terminal, a second diode connected between said fifth terminal and said eighth terminal, a third diode connected between said seventh terminal and said sixth terminal, a fourth diode connected between said eighth terminal and said sixth terminal, and
- a diode chain including a plurality of diodes connected in series between said seventh terminal and said eighth terminal;

a plurality of tap leads, each tap lead being connected to an anode of a corresponding diode in said series-connected diode chain;

whereby said seventh terminal can be selectively connected to said tap leads and said eighth terminal, thereby short circuiting a selected number of said plurality of diodes in said diode chain so that a DC input signal applied to said first and second terminals can be incrementally regulated and output on said third and fourth terminals.

8. A variable power supply, comprising:

a first terminal and a second terminal for receiving an AC input signal;

a third terminal and a fourth terminal for outputting a regulated DC signal;

a transformer having a primary winding connected across said first and second terminals, and a secondary winding having a first output and a second output;

a regulating circuit having a fifth terminal coupled to said first output of said transformer, a sixth terminal connected to said second output of said transformer, a seventh terminal, and an eighth terminal connected to said seventh terminal through a capacitance, said regulating circuit further comprising,

- a diode bridge including a first diode connected between said fifth terminal and said seventh terminal, a second diode connected between said fifth terminal and said eighth terminal, a third diode connected between said seventh terminal and said sixth terminal, a fourth diode connected between said eighth terminal and said sixth terminal, and
- a diode chain including a plurality of diodes connected in series between said seventh terminal and said eighth terminal;

a plurality of tap leads, each tap lead being connected to an anode of a corresponding diode in said series-connected diode chain;

whereby said third terminal can be selectively connected to said tap leads and said eighth terminal, thereby short circuiting a selected number of said plurality of diodes in said diode chain so that an AC input signal applied to said first and second terminals is amplified and regulated to a selectable DC level which is output on said third and fourth terminals.

9. A variable power supply according to claim 8, further comprising a single-pole multi-throw switch for selectively connecting said third terminal to said tap leads and said eighth terminal, thereby short circuiting a selected number of said plurality of diodes in said diode chain so that an AC input signal applied to said first and second terminals is amplified and regulated to a selectable DC level which is output on said third and fourth terminals.

10. A variable voltage regulator, comprising:

a first terminal and a second terminal for receiving an AC input signal;

a third terminal and a fourth terminal for outputting a regulated AC signal;

a regulating circuit having a fifth terminal connected to said third terminal, a sixth terminal connected to said second terminal and said fourth terminal, a seventh terminal and an eighth terminal, said regulating circuit further comprising,

- a diode bridge including a first diode connected between said fifth terminal and said seventh terminal, a second diode connected between said fifth terminal and said eighth terminal, a third diode connected between said seventh terminal and said sixth terminal, a fourth diode connected between said eighth terminal and said sixth terminal, and
- a diode chain including a plurality of diodes connected in series between said seventh terminal and said eighth terminal; and an impedance connected between said first terminal and a junction of said third terminal and fifth terminal;

a plurality of tap leads, each tap lead being connected to an anode of a corresponding diode in said series-connected diode chain;

whereby said seventh terminal can be selectively connected to said tap leads and said eighth terminal, thereby short circuiting a selected number of said plurality of diodes in said diode chain so that an AC input signal applied to said first and second terminals can be incrementally regulated and output on said third and fourth terminals.

11. A variable voltage regulator according to claim 10, wherein said plurality of diodes in said diode chain are Zener diodes and said seventh terminal can be selectively connected to said tap leads and said eighth terminal, thereby short circuiting a selected number of said plurality of zener diodes in said diode chain to provide an incrementally adjustable voltage clamp when an AC input signal is applied to said first and second terminals.

12. A variable voltage regulator, comprising:

a first terminal and a second terminal for receiving an AC input signal;

a third terminal and a fourth terminal for outputting a regulated AC signal, said third terminal being connected to said first terminal;

a regulating circuit having a fifth terminal, a sixth terminal connected to said second terminal and said fourth terminal, a seventh terminal and an eighth terminal, said regulating circuit further comprising,

- a diode bridge including a first diode connected between said fifth terminal and said seventh terminal, a second diode connected between said fifth terminal and said eighth terminal, a third diode connected between said seventh terminal and said sixth terminal, a fourth diode connected between said eighth terminal and said sixth terminal, and
- a diode chain including a plurality of diodes connected in series between said seventh terminal and said eighth terminal;

a plurality of tap leads, each tap lead being connected to an anode of a corresponding diode in said series-connected diode chain; and an impedance connected between said fifth terminal and a junction of said first terminal and third terminal;

whereby said seventh terminal can be selectively connected to said tap leads and said eighth terminal, thereby short circuiting a selected number of said plurality of diodes in said diode chain so that an AC input signal applied to said first and second terminals can be incrementally regulated and output on said third and fourth terminals.

13. A variable voltage regulator according to claim 12, wherein said plurality of diodes in said diode chain are zener diodes and said seventh terminal can be selectively connected to said tap leads and said eighth terminal, thereby short circuiting a selected number of said plurality of zener diodes in said diode chain to provide an incrementally adjustable voltage regulator when an AC input signal is applied to said first and second terminals.

14. A variable voltage regulator, comprising:
a first terminal and a second terminal for receiving a DC input signal;
a third terminal and a fourth terminal for outputting a regulated DC signal;
a regulating circuit having a fifth terminal connected to said third terminal, a sixth terminal connected to said second terminal and fourth terminal, a seventh terminal and an eighth terminal, said regulating circuit further comprising,
  a diode bridge including a first diode connected between said fifth terminal and said seventh terminal, a second diode connected between said fifth terminal and said eighth terminal, a third diode connected between said seventh terminal and said sixth terminal, a fourth diode connected between said eighth terminal and said sixth terminal, and
  a diode chain including a plurality of diodes connected in series between said seventh terminal and said eighth terminal;
a plurality of tap leads, each tap lead being connected to an anode of a corresponding diode in said series-connected diode chain; and
an impedance connected between said first terminal and a junction of said third terminal and fifth terminals;
whereby said seventh terminal can be selectively connected to said tap leads and said eighth terminal, thereby short circuiting a selected number of said plurality of diodes in said diode chain so that a DC input signal applied to said first and second terminals can be incrementally regulated and output on said third and fourth terminals.

15. A variable voltage regulator according to claim 14, further comprising a single-pole multi-throw switch for selectively connecting said seventh terminal to said tap leads and said eighth terminal, thereby short circuiting a selected number of said plurality of diodes in said diode chain to incrementally reduce an output voltage when a DC input signal is applied to said first and second terminals.

* * * * *